United States Patent
Garotte

(10) Patent No.: US 9,511,686 B2
(45) Date of Patent: Dec. 6, 2016

(54) SPACER PIECE AND SECTION PIECE FOR SLIDE RAIL OF AUTOMOTIVE VEHICLE SEAT

(75) Inventor: Gérald Garotte, Bellou en Houlme (FR)

(73) Assignee: FAURECIA SIEGES D'AUTOMOBILE, Landigou (FR)

( * ) Notice: Subject to any disclaimer, the term of this patent is extended or adjusted under 35 U.S.C. 154(b) by 0 days.

(21) Appl. No.: 13/414,998

(22) Filed: Mar. 8, 2012

(65) Prior Publication Data

US 2012/0256074 A1    Oct. 11, 2012

(30) Foreign Application Priority Data

Apr. 5, 2011 (FR) .................................. 11 52948

(51) Int. Cl.
    *B60N 2/07*        (2006.01)

(52) U.S. Cl.
    CPC ............. *B60N 2/073* (2013.01); *B60N 2/0705* (2013.01)

(58) Field of Classification Search
    CPC .............................. B60N 2/0705; B60N 2/073
    USPC ..... 248/429, 430, 424, 419, 420; 296/65.13, 296/65.14, 65.15, 65.11, 65.12; 297/344.1, 297/344.11–344.19; 108/143; 312/334.33, 312/334.15, 334.17, 334.25, 334.26, 334.37, 312/334.38, 334.9, 334.11; 16/93 R, 95 R–96 L
    See application file for complete search history.

(56) References Cited

U.S. PATENT DOCUMENTS

| | | | |
|---|---|---|---|
| 2,761,939 A | 9/1956 | Finchelstein et al. | |
| 3,944,302 A | 3/1976 | Fourrey | |
| 4,511,187 A * | 4/1985 | Rees | 384/18 |
| 4,821,991 A * | 4/1989 | Aihara et al. | 248/430 |
| 5,524,504 A * | 6/1996 | Brandoli et al. | 74/527 |
| 5,961,089 A * | 10/1999 | Soisnard | 248/430 |
| 6,033,155 A * | 3/2000 | Irvine et al. | 405/281 |
| 6,176,460 B1 * | 1/2001 | Kojima et al. | 248/429 |
| 6,520,474 B2 | 2/2003 | Yoshida et al. | |
| 6,695,379 B1 * | 2/2004 | Ishida | 296/65.14 |
| 6,886,797 B2 * | 5/2005 | McCullen et al. | 248/429 |
| 6,953,178 B2 * | 10/2005 | Yamada et al. | 248/429 |
| 7,314,204 B2 * | 1/2008 | Kohmura | 248/430 |
| 7,325,851 B2 * | 2/2008 | Ito et al. | 296/65.13 |

(Continued)

FOREIGN PATENT DOCUMENTS

| | | |
|---|---|---|
| EP | 1 116 624 | 7/2001 |
| FR | 2 250 400 | 10/1973 |

(Continued)

OTHER PUBLICATIONS

Preliminary Search Report and Written Opinion for related French Application No. FR 05 07846; report dated Jun. 14, 2006.

*Primary Examiner* — Jonathan Liu
*Assistant Examiner* — Guang H Guan
(74) *Attorney, Agent, or Firm* — Miller, Matthias & Hull LLP

(57) ABSTRACT

Reinforced section piece comprising a metal section piece and a reinforcing spacer piece, said section piece having a generally U-shaped cross-section with a base portion, said section piece comprising side wings extending perpendicularly on each side from the transverse ends of the base portion, with inner surfaces facing each other at an inside distance, the reinforcing spacer piece comprising a body having a width that is slightly less than the inner distance, and being configured to prevent the lessening of the distance between the two side wings, the reinforcing spacer piece additionally comprising protuberances projecting outwards from the body in the transverse direction, facing the curved surfaces of the male section piece.

9 Claims, 3 Drawing Sheets

(56) References Cited

U.S. PATENT DOCUMENTS

| | | | |
|---|---|---|---|
| 7,422,186 B2* | 9/2008 | Kropfreiter | B60N 2/067 248/424 |
| 7,815,159 B2* | 10/2010 | Moriyama | B60N 2/0727 248/430 |
| 7,992,834 B2* | 8/2011 | Kojima | B60N 2/0725 248/424 |
| 8,196,888 B2* | 6/2012 | Yamada et al. | 248/429 |
| 8,256,822 B2* | 9/2012 | Koga et al. | 296/65.15 |
| 2004/0206878 A1* | 10/2004 | Borbe et al. | 248/424 |
| 2009/0051208 A1* | 2/2009 | Szybisty et al. | 297/463.1 |
| 2010/0327139 A1* | 12/2010 | Wojatzki et al. | 248/429 |
| 2011/0095160 A1* | 4/2011 | Kimura | B60N 2/067 248/429 |
| 2012/0256074 A1* | 10/2012 | Garotte | B60N 2/073 248/429 |

FOREIGN PATENT DOCUMENTS

| | | |
|---|---|---|
| FR | 2 728 203 | 6/1996 |
| FR | 2761939 | 10/1998 |
| FR | 2 888 791 | 1/2007 |

* cited by examiner

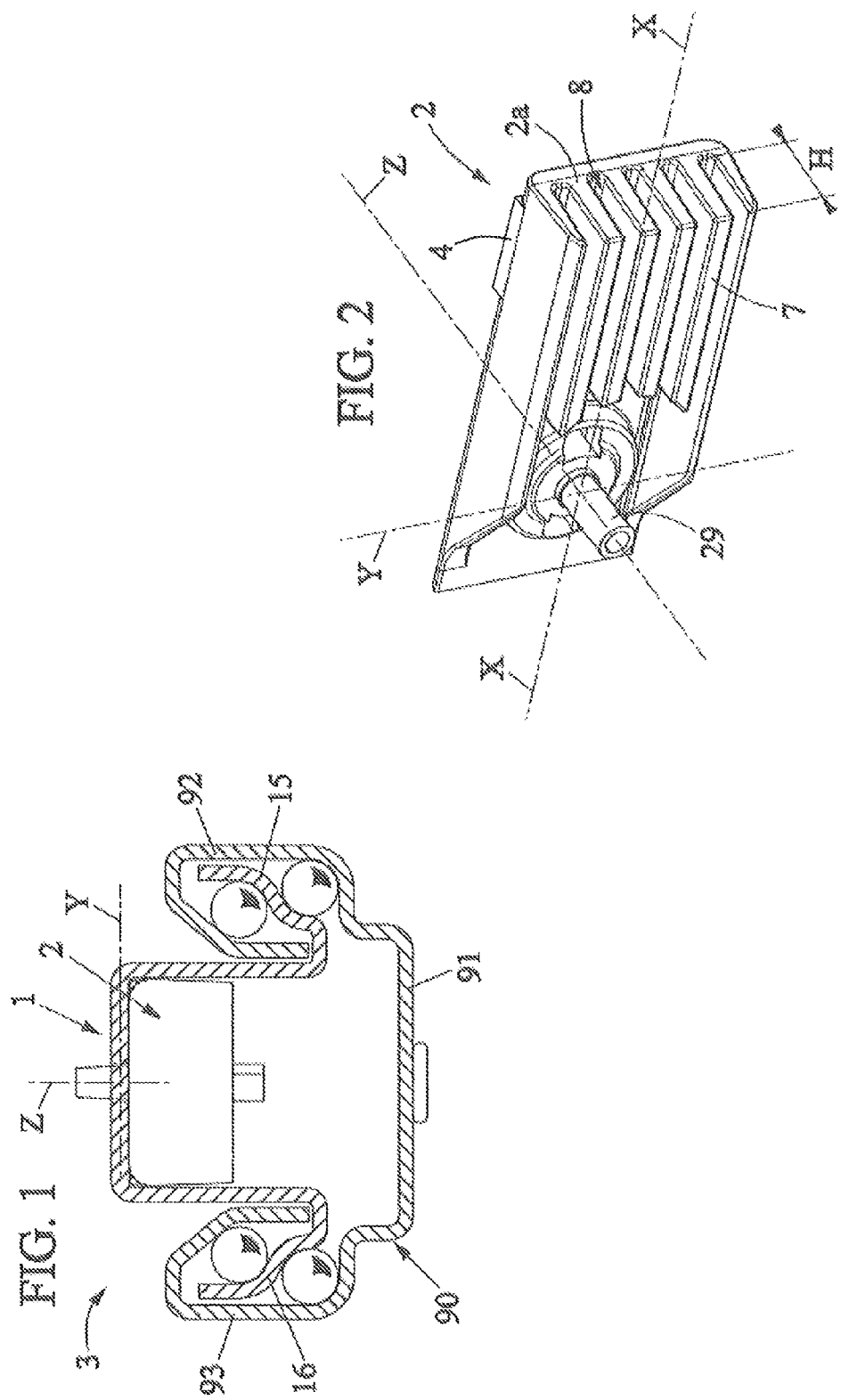

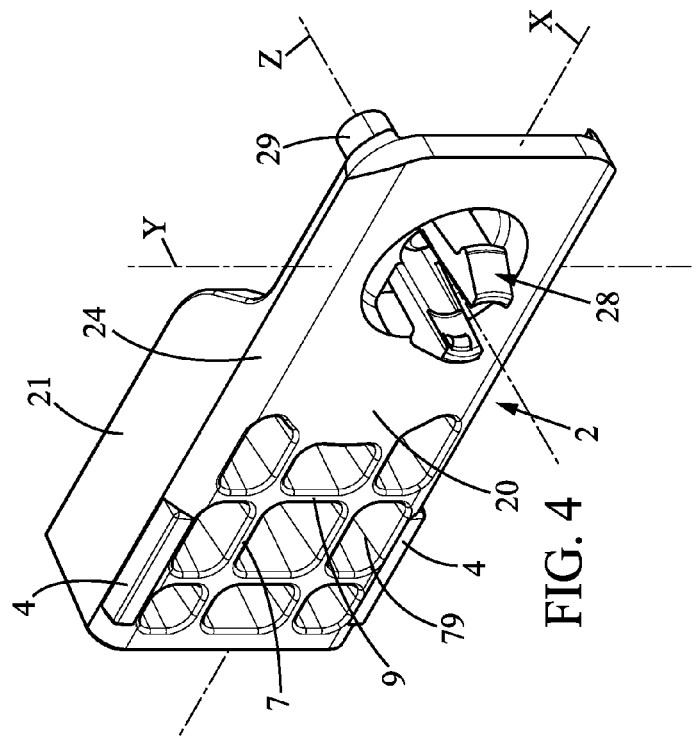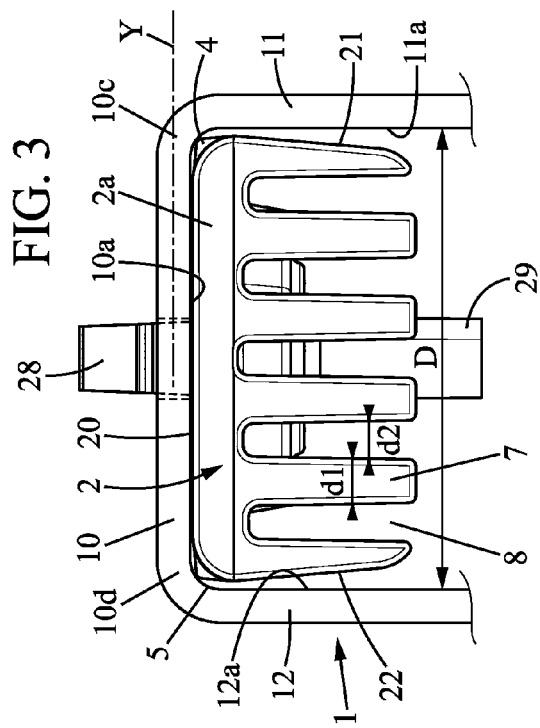

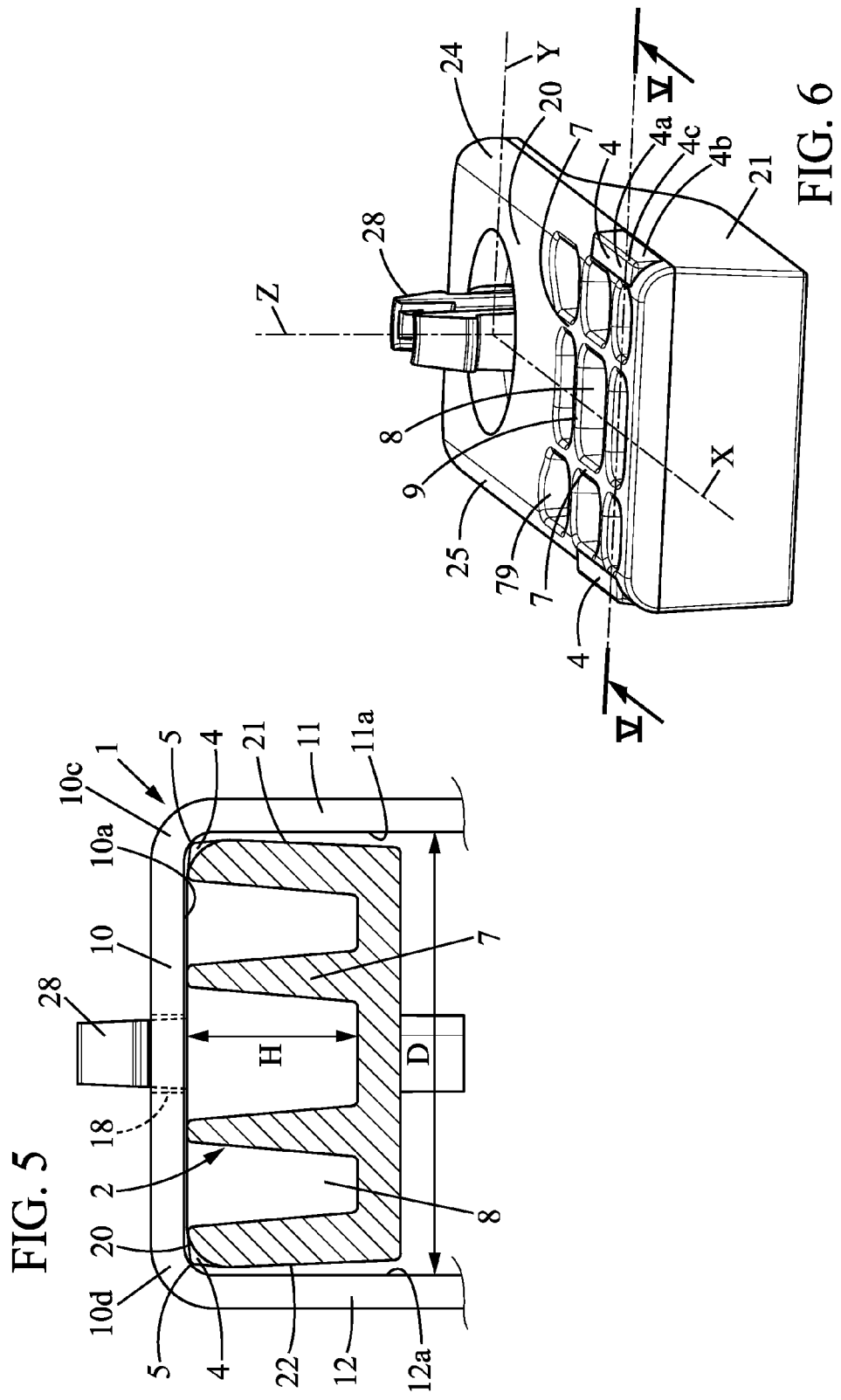

US 9,511,686 B2

SPACER PIECE AND SECTION PIECE FOR SLIDE RAIL OF AUTOMOTIVE VEHICLE SEAT

CROSS-REFERENCE TO RELATED APPLICATIONS

This application claims priority under the Paris Convention to French Patent Application No. FR 11 52948, filed on Apr. 5, 2011.

FIELD OF THE DISCLOSURE

The invention relates to the section pieces used in slide rails for automotive vehicle seats and to the reinforcing spacer pieces used in such slide rails.

BACKGROUND OF THE DISCLOSURE

It particularly relates to a reinforcing spacer piece, adapted for assembly between two metal walls of a section piece and configured to limit the compression of said section piece. This reinforcing spacer piece extends longitudinally.

The invention also relates to a reinforced section piece comprising a metal section piece and such a reinforcing spacer piece, said section piece extending longitudinally and having a generally U-shaped cross-section, with a base portion extending substantially in a plane containing the longitudinal direction and a perpendicular transverse direction, said section piece comprising first and second side wings forming said metal walls, extending substantially perpendicularly on each side from the transverse ends of the base portion, the first and second side wings respectively comprising first and second inner surfaces facing each other and spaced apart by an inside distance.

Such spacer pieces are known, as are such reinforced section pieces and slide rails for automotive vehicle seats which make use of them, for example from the document FR-A-2888791 which has a slide rail system. The slide rails and the section pieces in question are not optimal for absorbing energy during an impact nor with respect to the noises which may be generated in the presence of certain vibration stresses.

One aim of the present invention is to perfect the slide rails in order to improve their behavior under crash conditions and improve their quietness in the presence of certain vibration stresses, while maintaining satisfactory sturdiness, ease of assembly, and a low production cost.

SUMMARY OF THE DISCLOSURE

For this purpose, in the invention, the reinforcing spacer piece is characterized by the fact that it comprises walls extending longitudinally, and by a transverse section in a plane perpendicular to the longitudinal axis comprising an alternating succession of portions of said walls and recessed spaces.

For this purpose, in the invention, the reinforced section piece comprises a metal section piece and such a reinforcing spacer piece.

With these arrangements, in case of impact, the reinforced section piece with its reinforcing spacer piece absorbs a portion of the energy of the impact while limiting the compression of the section piece. The section piece emits very little or no spurious noise in the presence of most vibration stresses.

In various embodiments of the invention, one or more of the following arrangements may be used:
- said wall portions each have a first transverse dimension d1 and the recessed spaces each have a second transverse dimension similar to the first transverse dimension, such that the compression in case of impact is limited to about half the width of the body of the spacer piece;
- the base portion of the section piece comprises a bearing surface facing towards the inside of the U shape, the first and second inner surfaces each being connected to the bearing surface by a curved surface, the reinforcing spacer piece additionally comprising protuberances projecting outwards from the body in the transverse direction, facing the curved surfaces; said protuberances thereby limiting the noise in the presence of most vibration stresses;
- the body of the reinforcing spacer piece comprises a supporting surface, side edges, and rounded shapes connecting the side edges and the supporting surface, the protuberances being arranged on the rounded shapes; by means of which the rounded shapes substantially correspond to the curved surfaces and the protrusion of the protuberances is limited;
- the reinforcing spacer piece additionally comprises transverse walls such that the longitudinal walls and the transverse walls form cells, thus the energy absorbed in case of impact can be increased;
- the reinforcing spacer piece comprises snap-in feet which attach within an opening in the base portion of the section piece; by means of which the reinforcing spacer piece is maintained in a direction perpendicular to the plane of the base portion.

The invention also relates to a slide rail for an automotive vehicle seat, comprising a female section piece intended to be attached to said vehicle and extending along the longitudinal axis, and a male section piece formed by a section piece as described above and translationally guided relative to the female section piece along the longitudinal axis.

The invention also relates to a vehicle seat comprising a slide rail as described above.

DETAILED DESCRIPTION OF THE DISCLOSURE

Other features and advantages of the invention will be apparent from reading the following description of two of its embodiments, provided as non-limiting examples and referencing the attached drawings in which:

FIG. 1 is a transverse cross-sectional view of a slide rail for a vehicle seat, integrating a spacer piece and a section piece of the invention, FIG. 2 is a perspective view of the reinforcing spacer piece according to a first embodiment of the invention, FIG. 3 is a partial view of an end of the section piece with the reinforcing spacer piece of FIG. 2, FIG. 4 is a perspective view of the reinforcing spacer piece according to a second embodiment of the invention, FIG. 5 is a partial cross-sectional view of the reinforced section piece of FIG. 1 according to the second embodiment of the invention, and FIG. 6 is a perspective view of the reinforcing spacer piece of FIG. 4.

MORE DETAILED DESCRIPTION

In the different figures, the same references are used to denote the same or similar items.

FIG. 1 represents a transverse cross-sectional view of a slide rail 3 for a vehicle seat, onto which a seat base is attached. Said seat can be moved by adjustment in the longitudinal direction X, for example by means of two longitudinal slide rails 3.

The rail 3 comprises a fixed section piece 90, called the first section piece or female section piece. This female section piece 90 has a generally U-shaped cross-section, open at the top with a central base 91 and wings 92,93 extending from each side of this central base 91, said wings curving towards the inside of the U; in the illustrated example, this female section piece is fixed to the floor of the vehicle by means known in the prior art, but it could be fixed to another element of the vehicle including in a non-horizontal direction.

This female section piece 90 constitutes the cradle which accepts a second section piece, called the male section piece 1.

Said male section piece 1 extends in the longitudinal direction X for at least a portion of the length of the slide rail, with a section comprising a central portion that is U-shaped and opening towards the central portion 91 of the female portion 90, and side extensions 15,16 which extend outwards on each side of this central portion to form a U shape and which curve back towards the base of the U in the vertical direction.

As illustrated in FIGS. 2 to 6, the central portion comprises a base portion 10 which extends substantially in a plane containing the longitudinal direction X and a perpendicular transverse direction Y. Said male section piece 1 comprises first and second side wings 11,12, extending substantially perpendicularly to the base portion 10, on each side, from the transverse ends 10c,10d of the base portion 10.

The first and second side wings respectively comprise first and second inner surfaces 11a,12a which are facing each other at an inside distance denoted D.

The base portion 10 comprises a bearing surface 10a oriented towards the inside of the U shape, the first and second inner surfaces 11a,12a being connected to the bearing surface 10a by a curved surface 5.

Advantageously, according to the invention, the curved surface 5 may be substantially in the form of the arc of a circle, as illustrated.

Advantageously, according to the invention, said male section piece 1 is equipped with at least one reinforcing spacer piece 2.

The reinforcing spacer piece 2 may be manufactured of a light alloy or of plastic, or of any other light and resistant material. The reinforcing spacer piece 2 is preferably formed of polyamide plastic PA 6-6. It comprises a body 2a having a width in the transverse direction Y which is slightly less than the inside distance D, said body resting on the bearing surface 10a and being configured to limit the lessening of the distance between the two side wings in case of significant mechanical stress, for example in case of impact. For example, significant stresses can be exerted in such cases in a vertical direction Z perpendicular to the plane of the base portion, which tends to compress the section piece in the Y direction.

The presence of the body of the reinforcing spacer piece 2 limits this movement and guarantees that the male section piece 1 is retained within the female section piece 90. In addition, the absorption of energy during the impact is progressive, because the reinforcing spacer piece 2 is compressed as it absorbs energy.

In a first embodiment of the invention (FIGS. 1 to 3), the reinforcing spacer piece 2 comprises longitudinal walls (or ribs) 7 extending in a plane XZ from the body 2a. These longitudinal ribs 7 are separated by recessed spaces 8, and as a result a transverse section in a plane perpendicular to the longitudinal axis X, as illustrated in FIG. 3, comprises an alternating succession of wall portions 7 and recessed spaces 8 which has a rake-like appearance.

Advantageously, according to the invention, said wall portions 7 each have a first transverse dimension d1 and the recessed spaces 8 each have a second transverse dimension d2 that is similar to the first transverse dimension d1. In this manner, in case of an impact, the compression is limited to about half the width of the body 2a of the spacer piece 2.

Without exceeding the scope of the invention, the number of ribs 7 as well as their respective thickness relative to the recessed spaces 8 could be different and be chosen to optimize impact resistance in relation to external parameters. Each rib 7 has a slight relief angle which facilitates unmolding the part. The height of the ribs along the Z axis can be chosen to ensure that the male section piece cannot escape from the female section piece in the Z direction.

In a second embodiment of the invention (FIGS. 1 and 4 to 6), the reinforcing spacer piece 2 additionally comprises transverse walls 9, so that the longitudinal walls 7 and the transverse walls 9 together form cells 79. This increases the transverse rigidity as well as the energy absorbed in case of impact.

One will note, as illustrated in FIG. 5, that a transverse cross-section, in a plane perpendicular to the longitudinal axis X, shows an alternating succession of portions of said walls 7 and recessed spaces 8 as was seen in the first embodiment.

The following elements apply to either of the two embodiments.

In addition, the reinforcing spacer piece 2 may comprise protuberances 4 which project outwards from the body in the transverse direction Y, facing the curved surfaces 5.

More specifically, the reinforcing spacer piece 2 may comprise a supporting surface 20, side edges 21,22, and rounded shapes 24,25 connecting the side edges and the supporting surface, the protuberances 4 being arranged on the rounded shapes 24,25.

Each protuberance 4 may have:
- an upper face 4a, substantially an extension of the supporting surface 20, slightly sloped relative to the plane XY,
- a side face 4b, substantially an extension of one of the side edges 21,22, slightly sloped relative to the plane XZ, the upper face 4a and the side face 4b forming an angle slightly greater than 90°,
- a radially arranged end 4c connecting the upper face 4a and the side face 4b.

The rounded shapes 24,25 have a form that substantially corresponds to the shape of the curved surfaces 5.

The longitudinal length of the protuberance(s) 4 in the longitudinal direction X is preferably greater than the radius of the circular arc shape 5.

In addition, the reinforcing spacer piece 2 comprises snap-in feet 28 which attach within an opening 18 in the base portion of the section piece, said opening having any appropriate shape. A tubular portion 29, centered on the Z axis, extends in the direction opposite the snap-in feet 28 relative to the plane XY.

Vibrations, particularly vibrations oriented in the transverse direction Y, tend to cause the reinforcing spacer piece 2 to move in the transverse direction Y. The presence of the protuberance(s) 4 prevents each of the side edges 21,22 from pressing directly against the inner surfaces 11a,12a. The end of the protuberance 4 presses against the curved surface 5 connected to the bearing surface 10a which forms a progressive ramp. In addition, when the protuberance 4 travels across the major portion of the curved shape 5, it reaches the inner surface 11a,12a tangentially with no point of inflexion, the movement in the Y direction having been progressively converted into movement in the Z direction.

Thus there is no clear contact on plane and noises are avoided.

The shape and size of the protuberance as well as the number of protuberances 4 can be chosen to give said protuberances a certain elasticity, which further reinforces the anti-noise properties discussed above.

Similarly, the shape and size of the longitudinal walls 7 and of the transverse walls 9 can be chosen to optimize the resistance when the section piece is compressed.

The invention claimed is:

1. A reinforced section piece for a slide rail system of a vehicle seat, the reinforced section piece comprising:
    a male section piece for the slide rail system of the vehicle seat, the male section piece extending in a longitudinal direction and having a generally U-shaped cross-section, the male section piece including:
        a base portion extending substantially in a plane containing the longitudinal direction and a transverse direction which is perpendicular to the longitudinal direction;
        a first side wing and a second side wing, the first and second side wings extending substantially perpendicularly from transverse ends of the base portion, the first side wing comprising a first inner surface and the second side wing comprising a second inner surface, the first and second inner surfaces facing each other and spaced apart by an inside distance;
    a reinforcing spacer piece for the slide rail system of the vehicle seat, the reinforcing spacer piece being fixedly assembled to the base portion of the male section piece between the first and second side wings, the reinforcing spacer piece including:
        a body, the body having a width in the transverse direction being slightly less than the inside distance separating the first and second side wings so that the body is spaced apart at a distance away from each of the first inner surface and the second inner surface;
        longitudinal walls extending in the longitudinal direction;
    wherein a transverse section of the reinforcing spacer piece in a plane perpendicular to the longitudinal direction comprises an alternating succession of portions of said longitudinal walls and recessed spaces; and
    wherein the reinforcing spacer piece limits a lessening of the inside distance between the first and second side wings in the case of mechanical stress, by absorbing a portion of mechanical energy;
    wherein an inside space is defined within the generally U-shaped cross-section between the base portion and the first and second side wings, and wherein the base portion comprises a bearing surface facing towards the inside space of the generally U-shaped cross-section, each of the first and second inner surfaces being connected to the bearing surface by a curved surface, wherein the reinforcing spacer piece additionally comprises elastic protuberances projecting outwards from the body along the transverse direction, facing the curved surfaces, so that the elastic protuberances come in contact with the curved surfaces to prevent noise due to vibrations.

2. The reinforced section piece according to claim 1, wherein the portions of the longitudinal walls each have a first transverse dimension (d1) and the recessed spaces each have a second transverse dimension (d2) which is substantially the same as the first transverse dimension (d1).

3. The reinforced section piece according to claim 1, wherein the body of the reinforcing spacer piece comprises a supporting surface, side edges, and rounded shapes connecting the side edges and the supporting surface, with the elastic protuberances being arranged on the rounded shapes.

4. The reinforced section piece according to claim 1, wherein the reinforcing spacer piece additionally comprises transverse walls such that the longitudinal walls and the transverse walls form cells.

5. The reinforced section piece according to claim 1, wherein the reinforcing spacer piece comprises snap-in feet which attach within an opening in the base portion of the male section piece.

6. The reinforced section piece according to claim 1, wherein each of the longitudinal walls has a same height (H) in a vertical direction.

7. The reinforced section piece according to claim 6, wherein the same height (H) of each of the longitudinal walls is substantially larger than a transverse distance (d2) separating every two immediately adjacent longitudinal walls of the longitudinal walls in the transverse direction.

8. A slide rail for an automotive vehicle seat, comprising:
    a female section piece, intended to be attached to a vehicle and extending along the longitudinal direction, and
    a male section piece, formed by the reinforced section piece as described in claim 1 and translationally guided relative to the female section piece along the longitudinal direction.

9. A vehicle seat comprising the slide rail according to claim 8.

* * * * *